United States Patent
Weissman et al.

(10) Patent No.: US 7,039,357 B2
(45) Date of Patent: May 2, 2006

(54) DIVERSITY COVERAGE

(75) Inventors: Haim Weissman, Haifa (IL); Eli Yona, Haifa (IL)

(73) Assignee: Qualcomm Incorporated, San Diego, CA (US)

( * ) Notice: Subject to any disclaimer, the term of this patent is extended or adjusted under 35 U.S.C. 154(b) by 113 days.

(21) Appl. No.: 09/892,365

(22) Filed: Jun. 26, 2001

(65) Prior Publication Data

US 2002/0016152 A1 Feb. 7, 2002

Related U.S. Application Data

(63) Continuation of application No. 09/596,955, filed on Jun. 16, 2000.

(51) Int. Cl.
*H04B 7/14* (2006.01)

(52) U.S. Cl. .................. 455/16; 455/11.1; 455/15; 455/448; 455/561

(58) Field of Classification Search .............. 455/11.1, 455/15, 560, 561, 67.1, 67.4, 422, 446, 448, 455/18
See application file for complete search history.

(56) References Cited

U.S. PATENT DOCUMENTS

| | | | |
|---|---|---|---|
| 4,901,307 A | 2/1990 | Gilhousen et al. ............ 370/18 |
| 5,404,570 A | 4/1995 | Charas et al. ................. 455/22 |
| 5,513,176 A * | 4/1996 | Dean et al. ................. 343/844 |
| 5,603,080 A * | 2/1997 | Kallander et al. ............. 455/14 |
| 5,890,055 A * | 3/1999 | Chu et al. ...................... 455/16 |
| 5,930,293 A * | 7/1999 | Light et al. .................. 375/211 |
| 6,078,823 A * | 6/2000 | Chavez et al. .............. 370/337 |
| 6,088,003 A * | 7/2000 | Bassirat ...................... 343/890 |
| 6,125,109 A * | 9/2000 | Fuerter ....................... 370/315 |
| 6,157,818 A * | 12/2000 | Rode .......................... 370/313 |
| 6,178,334 B1 * | 1/2001 | Shyy et al. .................. 455/446 |
| 6,272,351 B1 * | 8/2001 | Langston et al. ............. 348/21 |
| 6,373,832 B1 * | 4/2002 | Huang et al. ................ 370/342 |
| 6,374,119 B1 * | 4/2002 | Jun et al. ................... 455/11.1 |
| 6,449,477 B1 * | 9/2002 | Weissman ................... 455/422 |
| 2002/0039885 A1 * | 4/2002 | Weissman et al. ............ 455/20 |

* cited by examiner

*Primary Examiner*—Lester G. Kincaid
*Assistant Examiner*—Marcos L Torres
(74) *Attorney, Agent, or Firm*—Philip Wadsworth; Charles D. Brown; Donald C. Kordich

(57) ABSTRACT

A method for wireless communication, including positioning a first plurality of slave transceivers within a region and positioning a second plurality of slave transceivers within the region in positions spatially separated from the positions of the first plurality of slave transceivers. The method further includes receiving at the first plurality and at the second plurality of slave transceivers a reverse radio frequency (RF) signal generated by a mobile transceiver within the region and generating respective first and second slave signals responsive thereto. The method also includes conveying the first and second slave signals separately to a base transceiver station (BTS) external to the region, and processing the first and second slave signals conveyed to the BTS so as to recover information contained in the reverse RF signal generated within the region.

10 Claims, 3 Drawing Sheets

DIVERSITY COVERAGE

RELATED APPLICATIONS

This application is a continuation of U.S. application Ser. No. 09/596,955, filed on Jun. 16, 2000.

FIELD OF THE INVENTION

The present invention relates generally to communication networks, and specifically to cellular communication networks operating in enclosed spaces, which are cut off from cellular signals originating external to such spaces.

BACKGROUND OF THE INVENTION

In cellular communications systems there are typically regions where the coverage is difficult or incomplete, for example, within metal-framed structures, or underground. Methods for improving the coverage in regions such as these are known in the art.

In one system known in the art, a repeater is used between a base station transceiver subsystem (BTS) which is able to receive signals in a closed environment, such as a tunnel closed off to transmissions from the BTS. The system down-converts a high radio-frequency (RF) signal from the BTS to an intermediate frequency (IF) signal. The IF signal is then radiated by a cable and an antenna in the closed environment to a receiver that is also located in the closed environment. The receiver up-converts the IF signal to the original RF frequency. Such systems may be used with vehicles moving through a tunnel to enable passengers in the vehicle who would otherwise be cut off from the BTS to receive signals.

In accordance with another system known in the art, a plurality of repeater systems are used between a plurality of BTSs. The systems are used in association with an environment that is closed off to transmissions from the BTSs. Each repeater system down-converts an RF signal from a respective BTS to an IF signal. The IF signal is then transferred by a cable in the closed environment to one or more respective receivers in the closed environment. Each receiver up-converts the IF signal to the original RF frequency. Such systems are used with vehicles moving between overlapping regions in a tunnel, each region covered by one of the BTSs via its repeater system. Thus, passengers in the vehicle who would otherwise be cut off from one or more of the BTSs are able to receive signals from at least one of the BTSs throughout the tunnel.

In yet another system known in the art, a distributed antenna array is used within a region where reception is difficult. The performance of the antenna array is enhanced by generating signal diversity within the array. Each antenna in the array has a differential time delay applied to signals that it receives, thus generating received signal diversity. The differentially-delayed signals are preferably down-converted to an intermediate frequency and are then transferred out of the region via a cable.

Another system known in the art uses a wireless repeater comprising first and second spatially-separated antennas. Both antennas receive a signal from a transmitter, and the signal received by the second antenna has a time delay added to the original signal. The two signals are summed to form one aggregate signal, which is transmitted from a third antenna. A receiver of the aggregate signal is able to reconstruct the signals received by the first and second antennas.

Notwithstanding the above systems for providing coverage in areas where reception is difficult, problems of coverage in such areas continue to exist. The problems are exacerbated by the fact that even when signals in the areas can be detected, the signal quality is in many cases marginal. In other cases, signal levels of a transmission in an area of difficult coverage may vary strongly from moment to moment, so that while at initiation of the transmission the level may be more than adequate, during the course of transmission the level may become less than adequate. There is thus a need for an improved method for detection of signals in difficult reception areas. There is also a continuing need, as demands on cellular networks increase, to increase the capacity of a network without significant increase in the bandwidth requirements of the network.

SUMMARY OF THE INVENTION

It is one aspect of the disclosed method and apparatus to provide improved signal/noise ratio in a cellular transmission network. It is a further aspect of the disclosed method and apparatus to improve the capacity of a network. It will be recognized by those skilled in the art that there are many other aspects of the disclosed method and apparatus which are not made explicit at this time.

In preferred embodiments of the present invention, a group of stationary cellular transceivers, herein termed slave units, are distributed within a region that cannot be conveniently served by a base station transceiver subsystem (BTS). The slave units act as first repeaters for signals from the BTS. Typically, the region is an interior of a building, or an open region where reception of signals from the BTS is poor due to distance from the station or radiation shadowing by a structure between the BTS and the region. The slave units communicate via radiated signals (such as radio frequency (RF) signals) with a mobile transceiver (such as a mobile cellular telephone) in the region. The group of slave units is divided into a first and a second sub-group, having generally equal numbers of stationary transceivers in each sub-group.

The slave units of the first sub-group are separated spatially from the slave units of the second sub-group. The spatial separation is most preferably at least enough so that a signal received by the first sub-group and a signal received by the second sub-group, from one transmission of the mobile transceiver, are distinguishable. The signals are typically distinguishable in terms of amplitude, or phase, or time of arrival, or a combination of these or other signal parameters. Thus, the slave units of one of the sub-groups can function as diversity receivers with respect to the slave units of the other subgroup, which function as main receivers.

RF signals received by each sub-group of slave units from the mobile transceiver, referred to herein as reverse signals, are down-converted to intermediate frequency (IF) signals. The IF signals are then transferred from the region to a master unit, which acts as a second repeater, by one or more cables. IF signals from the main sub-group of slave units are transferred to a main-master sub-unit of the master unit. This main-master sub-unit up-converts the IF signals to main-reverse RF signals. Similarly, IF signals from the diversity sub-group of slave units are transferred to a diversity-master sub-unit, comprised in the master unit. The diversity-master sub-unit up-converts the IF signals to diversity-reverse RF signals. The main-reverse and diversity-reverse RF signals are transmitted by cable and/or over the air separately to the BTS. The BTS demodulates, recovers, and analyzes the information contained in the separate reverse RF signals. Maintaining the recovered RF signals as separate main-reverse and diversity-reverse signals gives an improvement in signal/noise ratio of up to 3 dB and improves reverse carrying capacity, compared to systems which combine the two types of signal before analysis in the BTS.

In some preferred embodiments of the present invention, forward RF signals from the BTS are received by the main-master sub-unit, and are down-converted therein to IF signals. The IF signals are transferred to the first and second sub-groups of slave units, and a delay is added to the IF signal transferred to one of the sub-groups. The IF signals are up-converted to forward RF signals in the slave units, and the RF signals, comprising delayed and non-delayed forward RF signals, are radiated from the units. The mobile transceiver receives both signals. Because of the time delay introduced into one of the signals, the mobile transceiver receives both signals as a composite signal comprising information contained in the first signal and in the second delayed signal. Most preferably, the information is demodulated and recovered in the mobile transceiver. This information is then used to regenerate an optimal representation of information conveyed in the original forward RF signals.

There is therefore provided, according to a preferred embodiment of the present invention, a method for wireless communication, including:

positioning a first plurality of slave transceivers within a region;

positioning a second plurality of slave transceivers within the region in positions spatially separated from the positions of the first plurality of slave transceivers;

receiving at the first plurality and at the second plurality of slave transceivers a reverse radio frequency (RF) signal generated by a mobile transceiver within the region and generating respective first and second slave signals responsive thereto;

conveying the first and second slave signals separately to a base station transceiver subsystem (BTS) external to the region; and processing the first and second slave signals conveyed to the BTS so as to recover information contained in the reverse RF signal generated within the region.

Preferably, the region is generally unable to receive signals transmitted over the air from the BTS.

Preferably, conveying the first and second slave signals separately to the BTS includes orthogonally polarizing the signals.

Preferably, receiving at the first plurality and at the second plurality of slave transceivers the reverse RF signal generated by the mobile transceiver and generating respective first and second slave signals includes down-converting the reverse RF signal so as to generate respective first and second intermediate frequency (IF) signals, and conveying the first and second slave signals separately to the BTS includes up-converting the respective IF signals in a master unit to recover the first and second slave signals.

Preferably, the method includes:

conveying a forward RF signal from the BTS to a master unit;

down-converting the forward RF signal to a forward IF signal;

splitting the forward IF signal into a first and a second IF signal;

delaying the second IF signal;

conveying the first and delayed second IF signals to the first and second plurality of slave transceivers respectively;

processing the first and delayed second IF signals to recover the forward RF signal and a delayed forward RF signal respectively; and transmitting the forward RF signal and the delayed forward RF signal to the mobile transceiver.

There is further provided, according to a preferred embodiment of the present invention, apparatus for wireless communication, including:

a first plurality of slave transceivers and a second plurality of slave transceivers, which first and second pluralities are spatially separated from one another within a region, and which first and second pluralities of slave transceivers are adapted to receive a radio frequency (RF) signal generated by a mobile transceiver within the region and to generate respective first and second slave signals responsive to the RF signal;

a first master unit, which receives and processes the first slave signal from the first plurality of slave transceivers and conveys the processed first signal to a base station transceiver subsystem (BTS); and a second master unit, which receives and processes the second slave signal from the second plurality of slave transceivers and conveys the processed second signal to the BTS separately from the processed first signal, such that information contained in the RF signal is recovered by processing the first and second processed signals received by the BTS.

Preferably, the region is generally unable to receive signals transmitted over the air from the BTS.

Preferably the apparatus includes a polarizing antenna coupled to the first and second master units, which antenna conveys the processed first signal and the processed second signal separately to the BTS as orthogonally polarized signals.

Preferably, the first and second plurality of transceivers include respective first and second down-converters which generate the first and second slave signals as respective first and second intermediate frequency (IF) signals, and the first master unit includes a first up-converter which recovers the processed first signal from the first IF signal, and the second master unit includes a second up-converter which recovers the processed second signal from the second IF signal.

Preferably, the first master unit includes:

a down-converter which converts a forward RF signal received from the BTS to a forward IF signal; and a splitter which splits the forward IF signal into a first and a second forward IF signal, and the second master unit includes a delay unit which delays the second forward IF signal, and the first plurality of slave transceivers includes respective pluralities of up-converters which recover the forward RF signal from the first forward IF signal and which transmit the forward RF signal to the mobile transceiver, and the second plurality of slave transceivers includes respective pluralities of up-converters which recover a delayed forward RF signal from the delayed second forward IF signal and which transmit the delayed forward RF signal to the mobile transceiver.

The present invention will be more fully understood from the following detailed description of the preferred embodiments thereof, taken together with the drawings, in which:

DETAILED DESCRIPTION OF PREFERRED EMBODIMENTS

Figure 1:
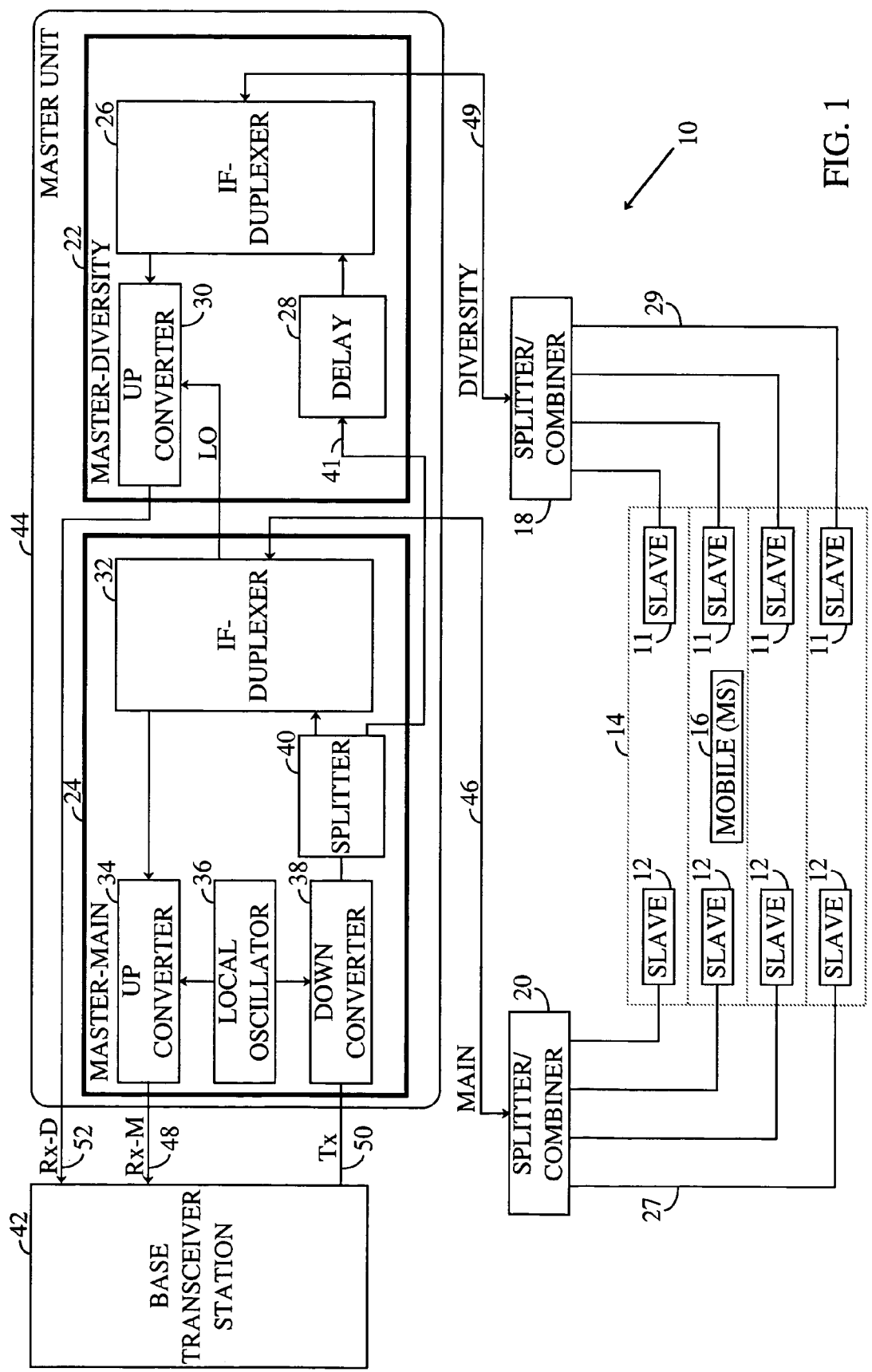
FIG. 1 is a schematic block diagram showing an area coverage system, according to one embodiment of the present invention.

Reference is now made to FIG. 1, which is a schematic block diagram showing an area coverage system 10, according to one embodiment of the present invention. A building 14 is substantially closed off to electromagnetic radiation from a base station transceiver subsystem (BTS) 42 external to the building. A mobile transceiver 16 within the building, such as an industry-standard mobile telephone, emits a radio frequency (RF) signal, herein termed a reverse-RF signal, receivable by BTS 42. In accordance with one embodiment, the RF signal emitted by mobile transceiver 16, herein also termed the reverse-RF transmitted signal, is a code division multiple access (CDMA) signal operating at an industry-standard chip rate, although the principles of the present invention are also applicable to other coding and transmission schemes.

A first sub-group of slave transceivers 12, herein also termed main slave transceivers, and a second sub-group of slave transceivers 11, herein also termed diversity slave transceivers, are positioned within building 14. Main slave transceivers 12 are most preferably connected in a star configuration, by one or more passive or active splitter/combiners 20. Alternatively, slave transceivers 12 are connected in a daisy chain or a hybrid star-daisy chain configuration. Similarly, diversity slave transceivers 11 are most preferably connected in a star configuration, by one or more passive or active splitter/combiners 18. Alternatively, slave transceivers 11 are connected in a daisy chain or a hybrid star-daisy chain configuration. Slave transceivers 11 and 12 are coupled to their respective splitter/combiners by cables 21.

Slave transceivers 11 are separated spatially from slave transceivers 12, but otherwise the slave transceivers are all substantially similar in construction and operation. The following is a description of the operation and construction of suitable slave transceivers as given in a U.S. patent application Ser. No. 09/430,616, entitled "In-Building Radio Frequency Coverage," filed 29 Oct. 1999, which is assigned to the assignee of the present application and whose disclosure is incorporated herein by reference.

Figure 2:
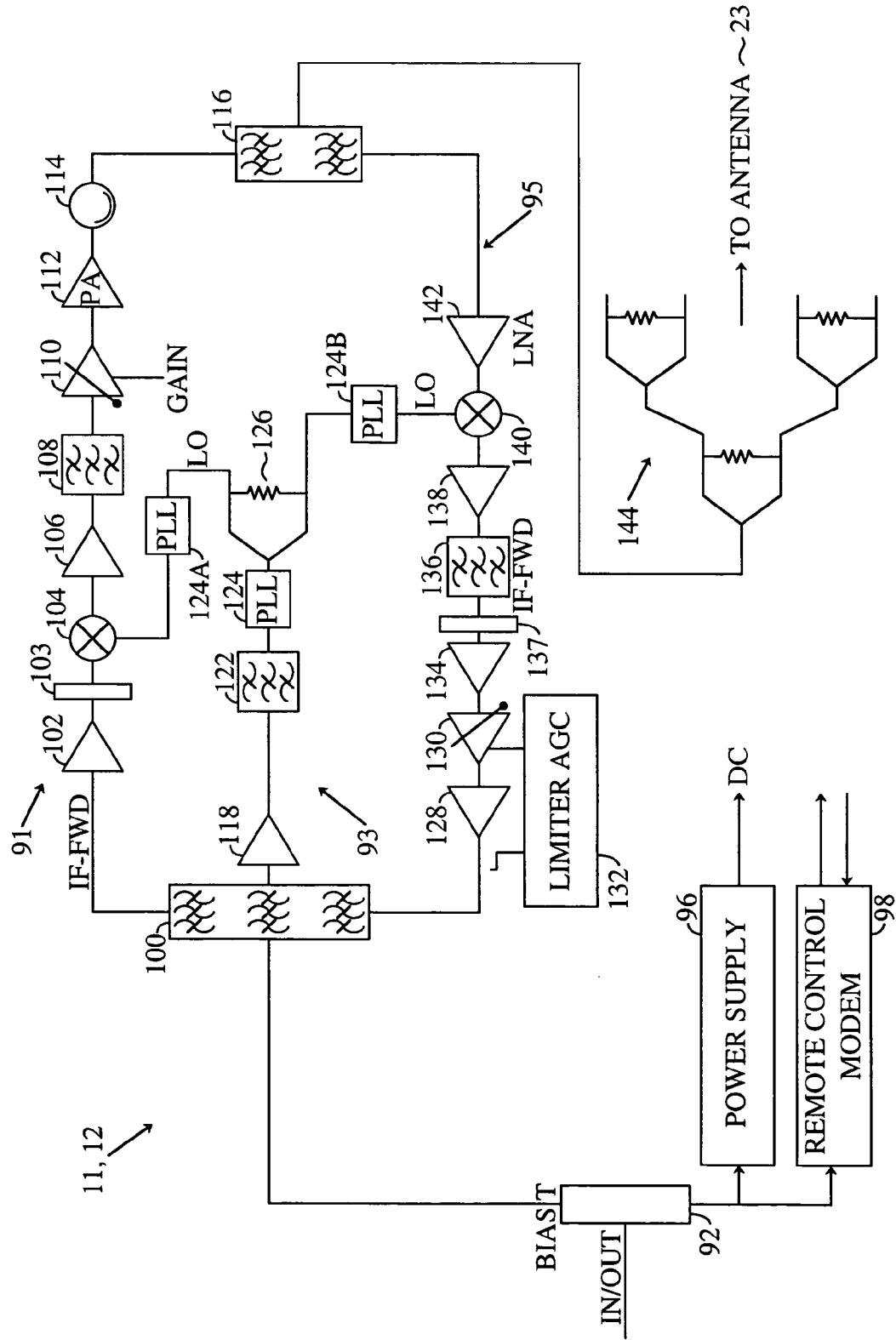
FIG. 2 is a schematic block diagram of a slave transceiver comprised in the area coverage system of FIG. 1, according to one embodiment of the disclosed method and apparatus.

FIG. 2 is a schematic block diagram of one of the slave transceivers 11, 12 (either a diversity slave transceiver 11 or a main slave transceiver 12) according to one embodiment of the disclosed method and apparatus. Each slave transceiver 11, 12 comprises a bias-T filter 92, which receives an intermediate frequency forward (IF-FWD) signal and a local oscillator reference signal (LO-REF) from master unit 44 via cables 21. Properties of the IF-FWD and LO-REF signals are described hereinbelow. Filter 92 also receives a DC and/or an AC power signal such as a 60 Hz rectangular or sinusoidal wave from master unit 44 via cables 21. Most preferably, filter 92 is arranged so that coupling or decoupling one of slave transceivers 11, 12 from cables 21 does not significantly affect operation of the other slave units.

Filter 92 acts as a port, splitting off the power signal to power each slave transceiver 11, 12 either directly or via an optional power supply 96, and transferring the IF-FWD and LO-REF signals received from master unit 44 to a triplexer 100. Triplexer 100 filters and separates the IF-FWD signal and the LO-REF signal, so that the IF-FWD signal follows a forward path 91 and the LO-REF signal follows a path 93. Preferably, path 93 comprises a pre-amplifier 118 which transfers the LO-REF signal via a narrow-band crystal filter 122 to a phase locked loop (PLL) oscillator 124. Oscillator 124 generates a reconstituted local oscillator signal in each slave transceiver 11, 12 by multiplying LO-REF by an integer. This reconstituted local oscillator signal has a frequency identical to that of a local oscillator signal originally synthesized by local oscillator 36 of master unit 44. The reconstituted local oscillator signal is input to a splitter 126, and from the splitter the signal is input to a mixer 104 and a mixer 140. The power level of the LO signal input to the splitter is preferably set as required to drive mixers 104 and 140. Alternatively, a PLL oscillator 124A and a PLL oscillator 124B are placed in path 93 after splitter 126, instead of oscillator 124 before the splitter. Oscillators 124A and 124B operate substantially as oscillator 124.

Path 91 comprises a preamplifier 102, which receives frequencies centered on IF-FWD from triplexer 100. The IF-FWD signal is then amplified before it is input to a variable delay 103. Delay 103 preferably comprises a surface acoustic wave (SAW) delay device. The SAW delay device delays signals in path 91 by a time of the order of 500 ns. Most preferably, the time delay is set to be at least half a chip rate of CDMA signals received by the master unit 44. The time delay provided by delay 103 is preferably set on installation of each slave transceiver 11, 12, or alternatively the time delay is set by a remote control modem 98, whose function is described in more detail below.

The signal from delay 103 is coupled to the input of mixer 104. Mixer 104 up-converts the IF-FWD signal received, using the reconstituted local oscillator signal, to regenerate a master RF signal received by master unit 44. The regenerated RF signal is amplified in an RF amplifier 106 and filtered in a band-pass filter 108. The amplifier and filter together provide an RF signal at a level suitable for coupling to the input of a variable-gain amplifier 110 and an RF power amplifier 112. Power amplifier 112 generates an RF power output signal corresponding to the original master signal received by master unit 44, which power signal is transferred via an isolator 114 to increase the voltage standing wave ratio. The power signal is input to an RF duplexer 116 which acts as a port. Duplexer 116 routes the power signal to a four-way splitter 144, to which up to four slave antennas 23 are coupled and which radiate the RF power signal.

Antennas 23 also receive a slave RF signal from mobile transceiver 16. The slave signal is routed via RF duplexer 116 along a reverse path 95 to a low noise pre-amplifier 142. The pre-amplifier is most preferably constructed from very-low-noise components by methods known in the art. A mixer 140 uses the reconstituted local oscillator signal received from splitter 126 and the output signal of pre-amplifier 142 to down-convert the slave RF signal to an intermediate frequency signal IF-REV. The IF-REV signal is amplified by an amplifier 138 feeding a band-pass filter 136. The filter 136 and amplifier 138 together operate to generate an IF-REV signal substantially free from unwanted sidebands, such as those produced in mixer 140.

The IF-REV signal output of filter 136 is preferably output to a variable delay 137. Delay 137 preferably comprises a SAW device that delays signals in path 95 by a time of the order of 2 ms. The time delay provided by SAW device 137 is preferably set on installation of each slave transceiver 11, 12. Alternatively, the time delay is set by remote control modem 98. The signal from delay 137 is routed through an amplifier 134, a variable-gain amplifier 130, and a power amplifier 128 to triplexer 100.

Alternatively, delay 137 is not present in the slave transceivers 11, 12, and the IF-REV signal output of filter 136 is routed directly to amplifier 134. The output of amplifier 128 is sampled by an automatic gain control (AGC) circuit. The output is used to adjust the gain of variable-gain amplifier 130, so that the level of the amplified IF-REV signal is maintained at a level consistent with a link budget. Triplexer 100 routes the output of amplifier 128 via filter 92 to the master unit 44.

Preferably, the remote control modem 98 is able to receive and decode control signals originating from the master unit 44. Most preferably, the control signals are utilized to set and/or read parameters of elements within slave transceiver 11, 12, such as the gains of amplifiers 110 and 130 and the delay time of delay 103, and/or levels of signals within the slave unit. Preferably, the control signals are transmitted as modulated signals on a base frequency within a range of approximately 280 MHz to approximately 500 MHz, although any other base frequency which is receivable by modem 98 and which does not interfere with the operation of slave transceivers 11, 12 and master unit 44 may be used. Preferably, parameters affecting the operation of each slave transceiver 11, 12, such as gains of amplifiers 110 and 130, are preset when each slave transceiver 11, 12 is set up, so that each slave transceiver 11, 12 is able to operate independently. Most preferably, the overall signal gain, from port to port, for path 91 and for path 95 is set to be of the order of 10–60 dB for each path.

Returning to FIG. 1, the spatial separation between slave transceivers 11 and slave transceivers 12 is sufficient so that when transceiver 16 makes a transmission, the reverse-RF signal received by the sub-group of slave transceivers 11 is distinguishable from the reverse-RF signal received by the sub-group of slave transceivers 12. For example, the received signals may differ in amplitude, or in phase, or in time of arrival, or in a combination of these or other signal parameters. Thus, main slave transceivers 12 receive the RF signal from mobile transceiver 16 as a main-reverse RF signal, and diversity slave transceivers 11 receive the RF signal from transceiver 16 as a diversity-reverse RF signal.

As described above, slave transceivers 11 and 12 operate by mixing the received reverse-RF signal with a local oscillator signal, thus down-converting the received RF signal to an intermediate frequency (IF) signal, as is known in the art. The IF signals from main slave transceivers 12 are transmitted as main-IF signals from building 14, via splitter/combiner 20 and a cable 46, to a main-master sub-unit 24 comprised in a master unit 44. It should be noted that the coupling of the main-master sub-unit 24 to the main slave transceivers 12 may be accomplished in any manner that distributes the signals from the main-master sub-unit 24 to the main slave transceivers 12 and provides the signals from the main slave transceivers 12 to the main-master sub-unit 24. Likewise, any such coupling may be provided between the diversity slave transceivers 11 and a diversity-master sub-unit 22.

Main-master sub-unit 24 comprises an IF-duplexer 32, which transfers the main-IF signals to an up-converter 34 in the main-master sub-unit. In up-converter 34 the main-IF signals are mixed with a local oscillator (LO) signal, generated by a local oscillator 36 most preferably comprised in main-master sub-unit 24, in order to recover the main-reverse RF signal received by main slave transceivers 12. The recovered main-reverse RF signal is then transmitted to BTS 42, preferably via a cable connection 48. Alternatively, the recovered main-reverse RF signal is transmitted to BTS 42 via a wireless connection. Methods for down-conversion and up-conversion of a transmitted RF signal as described hereinabove are known in the art, and a detailed description of one such method is also given in the above-mentioned U.S. Patent Application. It will be appreciated that slave transceivers 11 and 12 and master unit 44 act respectively as first repeaters coupled to a second repeater, for the purpose of transferring signals to the BTS from the building.

The IF signals from diversity slave transceivers 11 are transmitted as diversity-IF signals from building 14, via splitter/combiner 18 and a cable 49, to diversity-master sub-unit 22 comprised in master unit 44. Diversity-master subunit 22 comprises an IF-duplexer 26, which transfers the diversity-IF signals to an up-converter 30 comprised in the diversity-master sub-unit. In up-converter 30 the diversity-IF signals are most preferably mixed with the local oscillator signal generated by LO 36, in order to recover the diversity-reverse RF signal received by diversity slave transceivers 11. The recovered diversity-reverse RF signal is then transmitted to BTS 42, preferably via a cable connection 52. Alternatively, the recovered diversity-reverse RF signal is transmitted to BTS 42 via a wireless connection. It will be appreciated that the diversity-reverse RF signal is transmitted separately from the main-reverse RF signal to BTS 42, so that no degradation of signal/noise occurs by combining the two reverse RF signals, and so that reverse carrying capacity of the network is improved.

Main-master sub-unit 24 also comprises a down-converter 38, which receives a forward-RF signal from BTS 42. Preferably the forward-RF signal is transferred from BTS 42 to down-converter 38 by a cable connection 50. Alternatively, the forward-RF signal is transferred from the BTS to the down-converter 38 by a wireless connection. Down-converter 38 most preferably utilizes the LO signal from LO 36 to produce the IF-FWD signal. The IF-FWD signal is transferred to a splitter 40, which splitter divides the IF-FWD signal into a first and a second substantially similar IF-FWD signal. The first IF-FWD signal is transferred via duplexer 32 and splitter/combiner 20 to transceivers 12, wherein the BTS forward-RF signal is recovered by up-conversion.

The second IF-FWD signal is transferred via a cable 41 to duplexer 26. In the course of cable 41 there is a delay unit 28, most preferably formed from a surface acoustic wave filter acting as a delay generator. Alternatively, delay unit 28 may comprise any standard delay unit which is able to add a time delay to the forward-IF signals transmitted from splitter 28. Most preferably, the delay added by delay unit 28 is of the order of at least twice the chip period of the modulated RF signal transmitted by transceiver 16. The delayed IF-FWD signal is transferred via duplexer 26 and splitter/combiner 18 to diversity slave transceivers 11, wherein a delayed forward-RF signal is recovered by up-conversion.

Mobile transceiver 16 receives both the recovered forward-RF signal transmitted from transceivers 12 and the recovered delayed forward-RF signal transmitted from transceivers 11. The forward-RF signal and the delayed forward-RF signal are then utilized to derive an optimal forward-RF signal transmitted from BTS 42, using methods known in the art. For example, if the RF signal is a CDMA pilot RF signal, generated by the BTS for tracking mobile transceivers, mobile transceiver 16 is able to demodulate and recover the pilot signals by identifying strong multipath arrivals with a searcher comprised in the transceiver. Alternatively, optimal signals can be recovered by non-CDMA systems which are able to tolerate delays of the size described hereinabove, and/or which can implement appropriate delays. For example, a GSM system requires a delay of the order of 8 μs.

Figure 3:
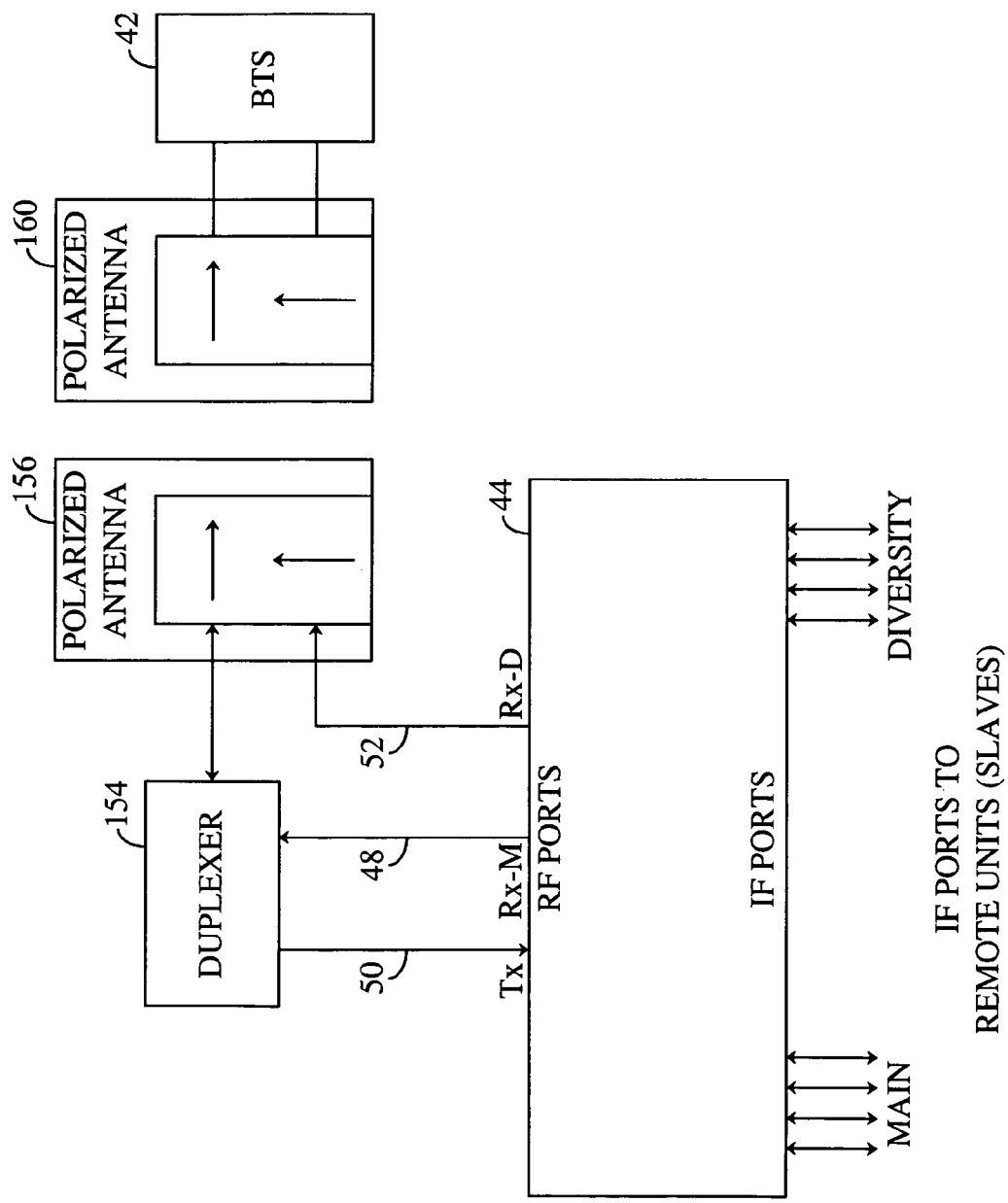
FIG. 3 is a schematic block diagram showing apparatus for conveying signals between a base station transceiver subsystem and a master unit comprised in the system of FIG. 1, according to one embodiment of the present invention

FIG. 3 is a schematic block diagram showing apparatus for conveying signals between BTS 42 and master unit 44, according to one embodiment of the present invention. A duplexer 154 is connected to cable connections 48 and 50, so that the forward-RF signal and the main-reverse RF signal are multiplexed. The multiplexed RF signal is coupled to a first polarizing port of a polarizing antenna 156. A second polarizing port, orthogonal to the first port, is coupled to the diversity-reverse RF signal. Thus, antenna 156 is able to transfer the multiplexed and diversity-reverse RF signals as substantially separate signals. A polarizing antenna 160, generally similar in operation to antenna 56, is coupled to BTS 42, so that the BTS is able to transmit forward-RF signals to master unit 44, and is able to receive separate main-reverse and diversity-reverse RF signals.

It will be appreciated that the scope of the present invention includes regions other than buildings closed off to electromagnetic radiation. Such regions comprise areas which are out of range of a base station transceiver subsystem due to distance from the station, or areas which are in a radiation shadow due to, for example, topography of the area, or because of a structure such as building intervening between the area and the station.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:

1. A method for wireless communication, comprising:
    positioning a first plurality of slave transceivers within a region;
    positioning a second plurality of slave transceivers within the region in positions spatially separated from the positions of the first plurality of slave transceivers;
    receiving, at the first plurality and at the second plurality of slave transceivers, a reverse radio frequency (RF) signal generated by a mobile transceiver within the region, and generating respective first and second slave signals responsive thereto, wherein each of the first and second slave signals are representative of the reverse RF signal, and wherein the first slave signal is distinguishable from the second slave signal;
    receiving, at a first master unit the first slave signal, and generating a first master signal, representative of the reverse RF signal, responsive thereto;
    receiving, at a second master unit, the second slave signal, and generating a second master signal, representative of the reverse RF signal, responsive thereto;
    conveying the first and second master signals separately to a base station transceiver subsystem (BTS) external to the region; and
    processing the first and second master signals conveyed to the BTS so as to recover information contained in the reverse RF signal.

2. The method according claim 1, wherein the region is generally unable to receive signals transmitted over the air from the BTS.

3. The method according to claim 1, wherein conveying the first and second master signals separately to the BTS comprises orthogonally polarizing the first and second master signals.

4. The method according to claim 1,
    wherein receiving at the first plurality and at the second plurality of slave transceivers the reverse RF signal generated by the mobile transceiver and generating respective first and second slave signals comprises:
    down-converting the reverse RF signal so as to generate respective first and second intermediate frequency (IF) signals, representative of the respective first and second slave signals,
    wherein receiving, at a first master unit, the first slave signal and generating the first master signal comprises:
    up converting, at the first master unit, the first IF signal to generate the first master signal, and
    wherein receiving at a second master unit the second slave signal and generating the second master signal comprises:
    up converting, at the second master unit, the second IF signal to generate the second master signal.

5. The method according to claim 1, and comprising:
    generating by the BTS a forward RF signal;
    down-converting the forward RF signal to a forward IF signal;
    splitting the forward IF signal into a first and a second IF signal;
    delaying the second IF signal to generate a delayed second IF signal;
    conveying the first and delayed second IF signals to the first and second plurality of slave transceivers, respectively;
    processing the first and delayed second IF signals by the the first and second plurality of slave transceivers, respectively, to recover the forward RF signal and a delayed forward RF signal, respectively; and
    transmitting the forward RF signal and the delayed forward RF signal, by the the first and second plurality of slave transceivers, respectively, to the mobile transceiver.

6. Apparatus for wireless communication, comprising:
    a first plurality of slave transceivers and a second plurality of slave transceivers, which first and second pluralities are spatially separated from one another within a region, and which first and second pluralities of slave transceivers are adapted to receive a radio frequency (RF) signal generated by a mobile transceiver within the region, and to generate respective first and second slave signals responsive to receiving the RF signal, wherein each of the first and second slave signals are representative of the RF signal, and wherein the first slave signal is distinguishable from the second slave signal;
    a first master unit, which receives and processes the first slave signal from the first plurality of slave transceivers to generate a first master signal, representative of the RF signal, and conveys the first master signal to a base station transceiver subsystem (BTS); and
    a second master unit, which receives and processes the second slave signal from the second plurality of slave transceivers to generate a second master signal, representative of the RF signal, and conveys the second master signal to the BTS separately from the first master signal, such that information contained in the RF signal is recovered by processing the first and second master signals separately received by the BTS.

7. The apparatus according claim 6, wherein the region is generally unable to receive signals transmitted over the air from the BTS.

8. The apparatus according claim 6, and comprising a polarizing antenna coupled to the first and second master units, which antenna conveys the first master signal and the second master signal separately to the BTS as orthogonally polarized signals.

9. The apparatus according claim 6, wherein the first and second plurality of slave transceivers comprise respective first and second down-converters which downconvert the RF signal to generate respective first and second intermediate frequency (IF) signals, representative of the respective first and second slave signals, wherein the first master unit comprises a first up-converter which upconverts the first IF signal to generate the first master signal, and wherein the second master unit comprises a second up-converter which upconverts the second IF signal to generate the second master signal.

10. The apparatus according claim 6, wherein the first master unit comprises:

a down-converter which converts a forward RF signal received from the BTS to a forward IF signal; and a splitter which splits the forward IF signal into a first and a second forward IF signal, wherein the second master unit comprises a delay with which delays the second forward IF signal to generate a delayed second forward IF signal, wherein the first plurality of slave transceivers comprise respective pluralities of up-converters which recover the forward RF signal from the first forward IF signal, and comprise respective pluralities of transmitters which transmit the forward RF signal to the mobile transceiver, and wherein the second plurality of slave transceivers comprise respective pluralities of up-converters which recover a delayed forward RF signal from the delayed second forward IF signal, and comprise respective pluralities of transmitters which transmit the delayed forward RF signal to the mobile transceiver.

* * * * *